United States Patent
Hsu et al.

(10) Patent No.: US 9,590,667 B1
(45) Date of Patent: Mar. 7, 2017

(54) METHOD AND APPARATUS FOR INTERFERENCE CANCELLATION BY A USER EQUIPMENT

(71) Applicant: MEDIATEK Inc., Hsin-Chu (TW)

(72) Inventors: Cheng-Yi Hsu, Taipei (TW); Mao-Ching Chiu, Chiayi County (TW); Wei-Nan Sun, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/854,067

(22) Filed: Sep. 15, 2015

(51) Int. Cl.
*H04B 7/02* (2006.01)
*H04B 1/04* (2006.01)
*H04B 7/04* (2006.01)

(52) U.S. Cl.
CPC ......... *H04B 1/0475* (2013.01); *H04B 7/0452* (2013.01)

(58) Field of Classification Search
CPC ............................ H04B 1/0475; H04B 7/0452
USPC .......................... 375/260, 267, 130, 340, 346
See application file for complete search history.

(56) References Cited

U.S. PATENT DOCUMENTS

| | | | |
|---|---|---|---|
| 8,744,026 B2* | 6/2014 | Rosenqvist | H04L 25/023 375/260 |
| 8,995,499 B2* | 3/2015 | Reial | H04L 5/0057 375/130 |
| 2010/0303182 A1* | 12/2010 | Daneshrad | H04B 1/10 375/346 |
| 2013/0114437 A1 | 5/2013 | Yoo et al. | |
| 2013/0279634 A1* | 10/2013 | Andgart | H04L 25/0224 375/340 |

\* cited by examiner

*Primary Examiner* — Daniel Washburn
*Assistant Examiner* — Fitwi Hailegiorgis
(74) *Attorney, Agent, or Firm* — McClure, Qualey & Rodack, LLP

(57) ABSTRACT

An apparatus for interference cancellation includes: a front end processing circuit, for receiving at least an interference signal and a desire signal; an inner processing circuit, for channel/noise estimation and for suppressing the interference signal; and a MIMO (multi-input multi-output) processing circuit, for blindly detecting an interference parameter of the interference signal based on the suppressed interference signal, and for jointly cancelling the interference signal from the desire signal and for demodulating the desire signal based on the detected interference parameter and the channel/noise estimation from the inner processing circuit.

10 Claims, 3 Drawing Sheets

METHOD AND APPARATUS FOR INTERFERENCE CANCELLATION BY A USER EQUIPMENT

TECHNICAL FIELD

The disclosure relates in general to a method and an apparatus for interference cancellation by blind detection.

BACKGROUND

Modern people are used in having various communication services (such as telephony, video, data, messaging and so on) provided by user equipment. Further, multiple-access technologies may support system resource share between multiple users.

Long Term Evolution (LTE) is an emerging telecommunication standard promulgated by Third Generation Partnership Project (3GPP) to better support mobile broadband Internet access. Advantages of LTE are for example, improved spectral efficiency, lower costs, improved services, making use of new spectrum and better integration with other open standards. LTE also support multiple-input multiple-output (MIMO) technology.

The base stations of the wireless communication network can support communication for a number of UEs (user equipment). A UE can communication with a base station via downlink and uplink. The downlink refers to the communication link from the base station to the UE; and the uplink refers to the communication link from the UE to the base station. On the downlink, a transmission from the base station to the target UE may suffer from the interference from other neighbor base station(s) or from other wireless transmitters (for example, 3G base stations or Wi-Fi stations). The interference includes co-channel interference (from other neighbor base stations) and co-scheduled UE interference (from the serving base station to other neighbor UE).

SUMMARY

The disclosure is directed to a method and an apparatus for interference cancellation by blind estimation/detection.

According to one embodiment of the disclosure, an apparatus for interference cancellation is disclosed. The apparatus includes: a front end processing circuit, for receiving at least an interference signal and a desire signal; an inner processing circuit, for channel/noise estimation and for suppressing the interference signal; and a MIMO (multi-input multi-output) processing circuit, for blindly detecting an interference parameter of the interference signal based on the suppressed interference signal, and for jointly cancelling the interference signal from the desire signal and demodulating the desire signal based on the detected interference parameter and the channel/noise estimation from the inner processing circuit.

According to another embodiment, a method for interference cancellation is provided. At least an interference signal and a desire signal are received. Channel/noise estimation is performed on the interference signal and the desire signal. The interference signal is suppressed. An interference parameter of the interference signal is blindly detected based on the suppressed interference signal. Cancellation the interference signal from the desire signal and demodulation of the desire signal based on the detected interference parameter and the channel/noise estimation are jointly performed.

Figure 1:
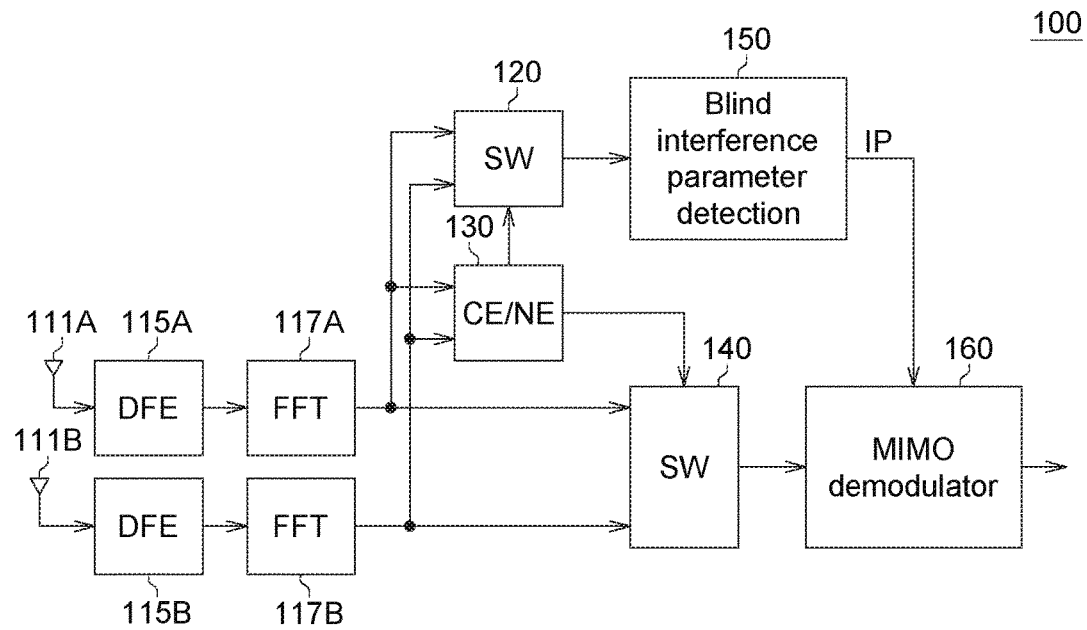
FIG. 1 shows a functional block diagram of a UE which cancels interference according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

The embodiments of the disclosure will be presented with reference to various apparatus and methods. The embodiments will described in the following detailed description and illustrated in the accompanying drawings by various blocks, modules, components, circuits, steps, processes, algorithms, etc. (collectively referred to as "elements"). These elements may be implemented using electronic hardware, computer software or any combination thereof. Whether such elements are implemented as hardware or software depends upon the application and design constraints imposed on the overall system.

FIG. 1 shows a functional block diagram of a UE which cancels interference according to an embodiment of the disclosure. Examples of UE include a cellular phone, a smart phone, a session initiation protocol (SIP) phone, a laptop, a personal digital assistant (PDA), a satellite radio, and a global positioning system and so on. Also, the UE may be referred to by those skilled in the art as a mobile station, a mobile unit/device/terminal/client, a subscriber unit, a wireless unit/device/terminal/client, a remote unit/device/terminal/client, or other suitable terminology.

In embodiments of the disclosure, the UE receives a desire signal from a serving base station. However, the UE may receive an interference signal from a neighbor base station and/or an interference signal (which is intended to be transmitted to another UE served by the same serving base station) from the serving base station. The interference signal from a neighbor base station is referred as a co-channel interference; and the interference signal from the serving base station for other neighbor UE is referred as a co-scheduled interference. The interference signal introduces interference into the received desire signal and thus it would be desirable to cancel interference in the received signal.

Thus, in order to cancel the co-channel interference and/or co-scheduled interference without receiving additional control information from the serving base station and/or the neighbor base station, the UE blindly estimates the modulation type parameter. The modulation type parameter includes for example but not limited by, quadrature phase-shift keying (QPSK), 16 QAM (quadrature amplitude modulation) and 64 QAM.

The blind estimation is made solely at the UE based on the received signal. In the embodiments, the estimation is made blindly rather than having the parameters provided from a serving/neighbor base station.

The UE cancels interference from the received signal by using the blindly estimated parameters.

As shown in FIG. 1, the UE 100 includes antennas 111A and 111B, digital front end (DFE) circuits 115A and 115B, Fast Fourier Transformation (FFT) units 117A and 117B, a first spatial whitening (SW) circuit 120, a channel/noise estimator (CE/NE) 130, a second spatial whitening (SW) circuit 140, a blind interference parameter detector 150 and a MIMO demodulator 160. Of course, other elements, such as a BRP (bit rate processing) circuit, a turbo decoder and so on, may be omitted here for simplicity. Besides, although FIG. 1 shows that the UE 100 includes two antennas 111A and 111B, but the disclosure is not limited by this. The DFE circuits and the FFT units may be collectively referred as a front-end processing circuit. The CE/NE and the SW circuits may be collectively referred as an inner processing circuit. The blind interference parameter detector 150 and the MIMO demodulator 160 may be collectively referred as a MIMO processing circuit.

The UE may have multiple antennas 111A and 111B supporting MIMO technology for spatial multiplexing, beamforming, and transmit diversity. Spatial multiplexing is generally used when channel conditions are good. When channel conditions are less favorable, beamforming may be used to focus the transmission energy in one or more directions.

The increasing use of multi-media and streaming in wireless devices has amplified the demand for bandwidth. One implementation for increasing bandwidth is through the use of multiple transmit antennas and/or multiple receive antennas for transmitting/receiving a signal. The use of multiple antennas offers significant increases in data throughput and link range without the need for additional bandwidth or transmit power. The increased data throughput can be achieved through higher spectral efficiency and link reliability obtained through antenna diversity. Also, the terms "input" and "output" of MIMO typically refers to the radio channel carrying the signal, and not to the devices having antennas.

Multi User (MU)-MIMO can utilize the accessibility of multiple independent mobile communication devices to enhance the communication capabilities of each individual device. MU-MIMO enables a terminal to transmit (or receive) a signal to/from multiple users in the same frequency band simultaneously. Beamforming allows multiple signals transmitted by different antennas add up constructively to increase the amplitude of the received signal.

According to this embodiment, a portion of the UE 100, such as the DFE 115A and 115B, may down-convert at least one received signal (which is received through at least one antenna 111A and 111B of the UE) and detect the preamble. Based upon the preamble detected by the DFE 115A and 115B, the UE 100 may perform time and frequency synchronization, channel estimation, equalization, and channel decoding. For example, the CE/NE 130 may perform a channel/noise estimation operation.

In FIG. 1, spatial whitening is applied to the result from the FFT units 117A and 117B by the first SW circuit 120. In one possible example, a received signal is input into the first spatial whitening circuit 120 along a channel response matrix for the stream of the received signal. The received signal and the channel response matrix are multiplied by a whitening matrix that is derived using the noise estimation from the CE/NE 130. By doing so, detection and decoding are enhanced. The spatial whitening circuit employs the estimated noise. In other words, the SW circuits 120/140 will suppress the interference signal.

In practical systems, the channel response matrix may be estimated using designated transmitted pilots, such as the reference signals in the 3GPP specification or other types of pilots transmitted in an OFDM system.

The UE receives at least an interference signal and at least a desire signal through the antennas. The UE then implements various signal processing functions (for example, spatial processing) on the received signals to recover any spatial streams destined for the UE. If multiple spatial streams are destined for the UE, they may be combined into a single symbol stream which is converted from the time domain to the frequency domain by the FFT units 117A and 117B. The frequency domain signal includes a separate symbol stream for each subcarrier of the signal.

The channel response matrix and the received signal may be multiplied by a constant that is proportional to the estimated noise from the CE/NE 130. Channel estimate derived from the CE/NE 130 may be used to select the appropriate coding and modulation schemes, and to facilitate spatial processing.

Also, the result from the FFT units 117A and 117B are input into the channel estimator/noise estimator (CE/NE) 130 for estimating channel and/or noise. The channel/noise estimation from the CE/NE 130 is also input into both the SW circuits 120 and 140.

The blind interference parameter detector 150 may blindly detect the interference parameter IP (for example, a modulation type parameter, a precoding parameter, a power parameter and so on) of the interference signal. In the field, the modulation type parameter, the precoding parameter and the power parameter of the desire signal (whose destination is the UE 100) will be informed by the serving base station to the UE; but however, the UE does not know the modulation type parameter, the precoding parameter and the power parameter of the interference signal. Thus, in the embodiment of the disclosure, the interference parameters of the interference signal will be blindly detected by the UE alone, without additional control information from the neighbor base station (in case of the co-channel interference) and/or from the serving base station (in case of the co-scheduled UE interference).

Blind detection may include determining whether the modulation format of the received signal is one of BPSK, 16QAM, 64QAM.

The MIMO demodulator 160 may joint interference cancellation and signal demodulation based on the output (i.e. the blindly detected parameter(s)) of the blind interference parameter detector 150. The interference cancellation is to cancel interference from the received signal due to the neighbor or the serving base station. Further, the MIMO demodulator 160 may cancel undesired symbols from the received signal. The signal demodulation is to demodulate the signal from the second SW circuit 140. In the embodiment, the MIMO demodulator 160 receives three inputs: the interference parameter from the blind interference parameter detector 150, the channel estimation from the CE/NE 130 and the whitened result from the SW circuit 140. The MIMO demodulator 160 may include a non-linear search module for performing signal/data demodulation whose details are omitted for simplicity. Besides, the details of the interference cancellation and the data/signal demodulation are omitted here for simplicity.

Figure 2:
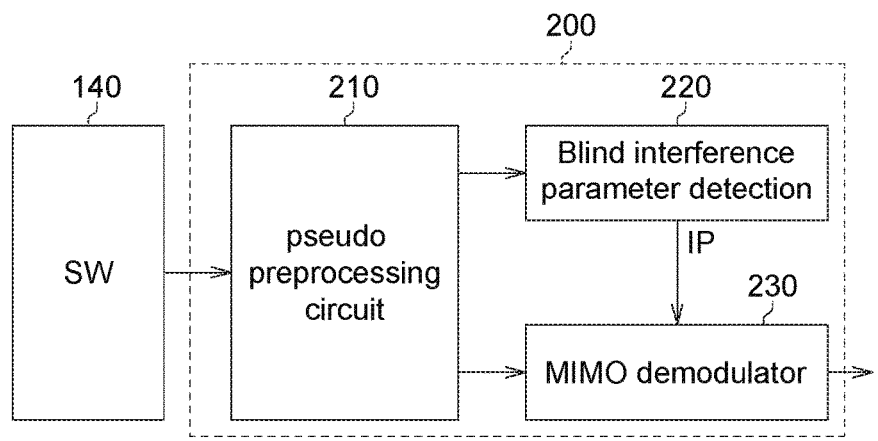
FIG. 2 shows a functional diagram for the MIMO processing circuit according to another embodiment of the disclosure.

FIG. 2 shows a functional diagram for the MIMO processing circuit according to another embodiment of the disclosure. The MIMO processing circuit 200 includes a pseudo preprocessing circuit 210, a blind interference parameter detector 220 and a MIMO demodulator 230. The blind interference parameter detector 220 and the MIMO demodulator 230 are similar or the same to the blind interference parameter detector 150 and the MIMO demodulator 160, and thus the detailed operations thereof are omitted.

The pseudo preprocessing circuit 210 is to separate/decouple the desire signal and the interference signal. After signal separation, the desire signal is input to the MIMO demodulator 230 for signal/data demodulation; and the interference signal is input to the blind interference parameter detector 220 for blind interference parameter detection.

At very low SNR (signal to noise ratio), noise suppression made by linear search (for example, MMSE (Minimum-Mean Square Error)) may have better performance than non-linear search (for example, ML (maximum likelihood)). Thus, in the embodiment of the disclosure, two implementations are proposed to boost the performance at low SNR situation.

Figure 3:
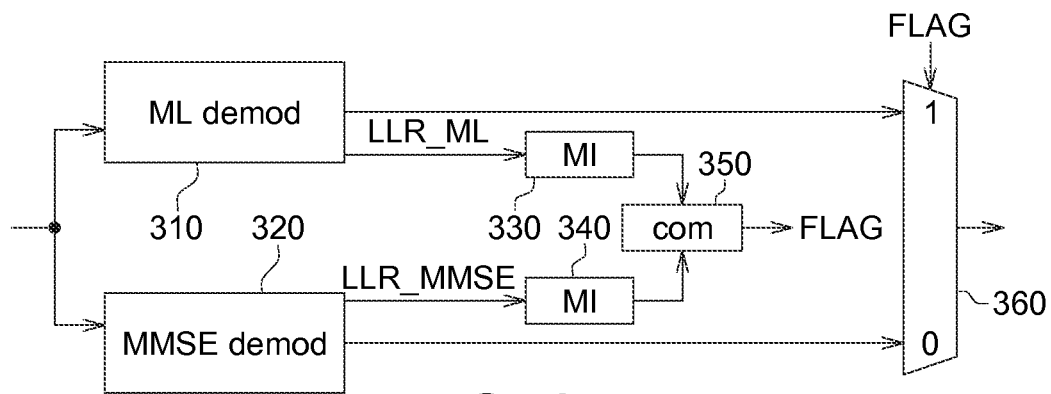
FIG. 3 and FIG. 4 show two possible implementations to boost the performance at low SNR situation according to still another embodiment of the disclosure.
Figure 4:
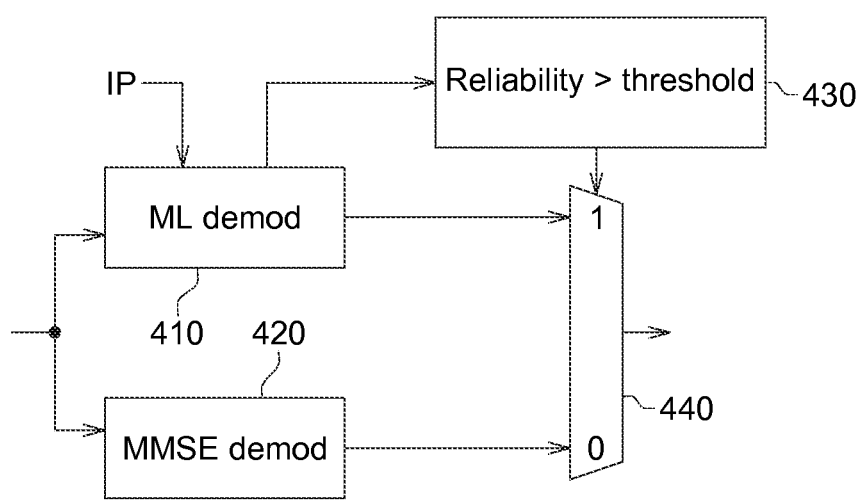

FIG. 3 and FIG. 4 show two possible implementations to boost the performance at low SNR situation according to still another embodiment of the disclosure.

As shown in FIG. 3, the MIMO demodulator includes a ML demodulator 310, a MMSE demodulator 320, MI (mutual information) units 330 and 340, a comparator 350 and a multiplexer 360. The ML demodulator is a non-linear search module and the MMSE demodulator is a linear search module.

FIG. 3 shows a parallel ML and MMSE demodulation scheme. That is, the ML demodulation and the MMSE demodulation are conducted concurrently.

After the ML demodulation and the MMSE demodulation are conducted by the ML demodulator 310 and the MMSE demodulator 320, respectively, LLR (Log-Likelihood Ratio) values LLR_ML and LLR_MMSE are obtained. Then, the MI units 330 and 340 obtain the average mutual information of the LLR values LLR_ML and LLR_MMSE per subcarrier. Then, the comparator 350 compares the LLR values LLR_ML and LLR_MMSE to output a flag signal FLAG which indicates which one of the average mutual information of the LLR values LLR_ML and LLR_MMSE is larger. The flag signal FLAG is used to control the multiplexer 360 to select. That is, if the flag signal FLAG indicates that the LLR value LLR_ML is larger (for example, FALG=1), then the multiplexer 360 selects the demodulation output of the ML demodulator 310 as output. On the contrary, if the flag signal FLAG indicates that the LLR value LLR_MMSE is larger (for example, FALG=0), then the multiplexer 360 selects the demodulation output of the MMSE demodulator 320 as output. In FIG. 3, the MI (mutual information) units 330 and 340, the comparator 350 and the multiplexer 360 may be collectively referred as a selector.

As shown in FIG. 4, the MIMO demodulator includes a ML demodulator 410, a MMSE demodulator 420, a judgment unit 430 and a multiplexer 440. The ML demodulator 410 is the same or similar to the MIMO demodulator 160 of FIG. 1. The reliability of the output from the ML demodulator 410 is derived from the difference of $1^{st}$ and $2^{nd}$ maximum term of exponent terms in LLR's log-sum expressions by an algorithm of the ML demodulation. If the judgment unit 430 judges that the reliability of the output from the ML demodulator 410 is larger than a reliability threshold (which means the ML demodulator 410 outputs a good demodulation result), then the judgment unit 430 controls the multiplexer 440 to select the demodulation output of the ML demodulator 410 as output. On the contrary, if the judgment unit 430 judges that the reliability of the output from the ML demodulator 410 is smaller than the reliability threshold (which means the ML demodulator 410 outputs a poor demodulation result), then the judgment unit 430 controls the multiplexer 440 to select the demodulation output of the MMSE demodulator 420 as output. In FIG. 4, the judgment unit 430 and the multiplexer 440 may also be collectively referred as a selector.

Thus, by the above two implementations, even at low SNR situation, the performance of the MIMO demodulation and interference cancellation is still good enough.

Figure 5:
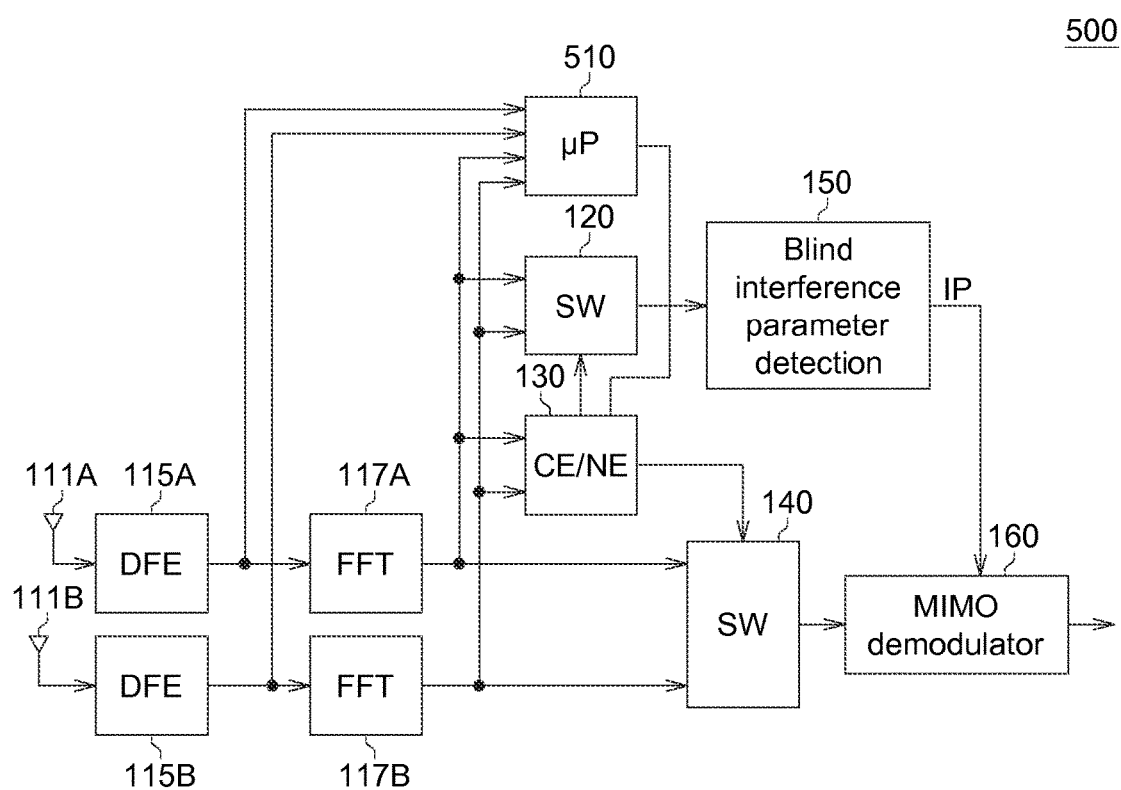
FIG. 5 shows a functional block diagram of a UE which cancels interference according to yet another embodiment of the disclosure.

FIG. 5 shows a functional block diagram of a UE which cancels interference according to yet another embodiment of the disclosure. As shown in FIG. 5, the UE 500 further includes a microprocessor 510. A measurement circuit (not shown) is coupled to the DFE 115A/115B and detects the number of the interference signals. The detection result of the measurement circuit is input to the microprocessor 510. Further, after FFT operation, the FFT 117A/117B further informs the microprocessor 510 about the number of the desire signals. The microprocessor 510 identifies the MIMO ability parameter (which indicates the respective upper limit of the number of the interference signals and the desire signals that the MIMO demodulator 160 can handle). Thus, based on the number of the interference signals, the number of the desire signals and the MIMO ability parameter, the microprocessor 510 informs the CE/NE 130 about how many channels/noise the CE/NE 130 has to estimate. Also, after informed by the microprocessor 510, the MIMO demodulator 160 knows the number of the interference signals and the number of the desire signal the MIMO demodulator has to process.

For example, if the number of the interference signals is 2, the number of the desire signals is also 2, and the MIMO ability parameter is 4 (for example, which indicates that the MIMO demodulator 160 can handle two interference signals and two desire signals), then the microprocessor 510 informs the CE/NE 130 to estimate two channels and two noise signals. In this situation, the MIMO demodulator 160 cancels the two interference signals from the two desire signal.

In another example, if the number of the interference signals is 3, the number of the desire signals is 1, and the MIMO ability parameter is 4 (for example, which indicates that the MIMO demodulator can handle two interference signals and two desire signals), then the microprocessor 510 informs the CE/NE 130 to estimate one channels and two noise signals. In this situation, the MIMO demodulator 160 will select two interference signals having larger amplitude and cancel the two selected interference signals from the desire signal.

In yet another example, if the number of the interference signals is 1, the number of the desire signals is 3, and the MIMO ability parameter is 4 (for example, which indicates that the MIMO demodulator can handle one interference signal and three desire signals), then the microprocessor 510 informs the CE/NE 130 to estimate three channels and one noise signal. But in this situation, the MIMO demodulator 160 cancels the interference signal from each of the three desire signals.

In yet another example, if the number of the interference signals is 2, the number of the desire signals is 1, and the MIMO ability parameter is 4 (for example, which indicates that the MIMO demodulator can handle two interference signals and one desire signal), then the microprocessor 510 informs the CE/NE 130 to estimate one channel and two noise signals. But in this situation, the MIMO demodulator 160 cancels the two interference signals from the desire signal.

In the embodiments of the disclosure, because the interference parameter are actually and precisely estimated/detected, the performance of the UE will be improved. That is because the interference cancellation is performed precisely.

In other possible embodiments of the disclosure, the blind interference parameter detector may be combined into the MIMO demodulator. That is to say, the MIMO demodulator may perform data/signal demodulation, blindly detect interference parameter and cancel interference.

Although the above embodiments process two signals (one desire single and one interference signal), one skilled person in the art would know that the disclosure is not limited by this. Based on the above description and the spirit of the disclosure, one skilled person in the art would know how to process more signals (one or more desire single and one or more interference signal), which is still within the scope of the disclosure.

The embodiments of the disclosure may be applicable in wireless communication systems, such as LTE/LTE-A systems, Wi-Fi systems, and 3G systems and so on.

In possible embodiments of the disclosure, the CE/NE and the MIMO demodulator may be combined into one single module (which may be collectively referred as a MIMO demodulator).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for interference cancellation comprising:
   a front end processing circuit, for receiving at least an interference signal and at least a desire signal;
   a microprocessor, for receiving a number of the interference signal and a number of the desire signal, identifying a MIMO ability parameter to inform about a number of channels/noise to be estimated, and informing about the number of the interference signal and the number of the desire signal to be processed; and
   an inner processing circuit, for receiving the MIMO ability parameter, performing channel/noise estimation on the interference signal and the desire signal and for suppressing the interference signal; and
   a MIMO (multi-input multi-output) processing circuit, for receiving the information about the number of the interference signal and the number of the desire signal to be processed, blindly detecting an interference parameter of the interference signal based on the suppressed interference signal, and for jointly cancelling the interference signal from the desire signal and demodulating the desire signal based on the detected interference parameter and the channel/noise estimation from the inner processing circuit.

2. The apparatus according to claim 1, wherein:
   the front end processing circuit includes a plurality of digital front end circuits and a plurality of Fast Fourier Transformation (FFT) circuits; and
   the inner processing circuit includes:
   a first spatial whitening circuit, for receiving and suppressing outputs from the FFT circuits of the front end processing circuit;
   a channel/noise estimator for estimating channel and/or noise from the outputs from the FFT circuits of the front end processing circuit; and
   a second spatial whitening circuit, for receiving and suppressing the outputs from the FFT circuits of the front end processing circuit based on an output from the channel/noise estimator.

3. The apparatus according to claim 1, wherein the MIMO processing circuit includes:
   a blind interference parameter detector, for detecting the interference parameter of the interference signal based on the suppressed interference signal; and
   a MIMO demodulator, for jointly cancel interference and demodulate based on an output of the blind interference parameter detector, and the channel/noise estimation and the suppressed interference signal from the inner processing circuit.

4. The apparatus according to claim 3, wherein the MIMO processing circuit further includes:
   a pseudo preprocessing circuit, for separating the interference signal and the desire signal, and after signal separation, the pseudo preprocessing circuit inputting the desire signal to the MIMO demodulator and the interference signal to the blind interference parameter detector, respectively.

5. The apparatus according to claim 1, wherein the MIMO processing circuit includes:
   a non-linear search module for demodulating the desire signal to output a first demodulation result,
   a linear search module for demodulating the desire signal to output a second demodulation result, and
   a selector, for selecting either one of the first and the second demodulation results based on a first and a second average mutual information of the first and the second demodulation results.

6. The apparatus according to claim 1, wherein the MIMO processing circuit includes:
   a non-linear search module for demodulating the desire signal to output a first demodulation result,
   a linear search module for demodulating the desire signal to output a second demodulation result, and
   a selector, for selecting either one of the first and the second demodulation results based on a reliability of the first demodulation result.

7. A method for interference cancellation comprising:
   receiving at least an interference signal and at least a desire signal;
   receiving a number of the interference signal and a number of the desire signal, identifying a MIMO ability parameter to inform about a number of channels/noise to be estimated, and informing about the number of the interference signal and the number of the desire signal to be processed;

performing channel/noise estimation on the interference signal and the desire signal and suppressing the interference signal;

blindly detecting an interference parameter of the interference signal based on the suppressed interference signal; and jointly cancelling the interference signal from the desire signal and demodulating the desire signal based on the detected interference parameter and the channel/noise estimation.

8. The method according to claim 7, further comprising:

separating the interference signal and the desire signal; and performing jointly cancellation and demodulation after signal separation.

9. The method according to claim 7, further including:

performing non-linear search for demodulating the desire signal to output a first demodulation result;

performing linear search for demodulating the desire signal to output a second demodulation result; and selecting either one of the first and the second demodulation results based on a first and a second average mutual information of the first and the second demodulation results.

10. The method according to claim 7, further including:

performing non-linear search for demodulating the desire signal to output a first demodulation result;

performing linear search for demodulating the desire signal to output a second demodulation result; and selecting either one of the first and the second demodulation results based on a reliability of the first demodulation result.

* * * * *